L. H. NASH.
ART OF FLYING AND METHOD OF OPERATING FLYING MACHINES.
APPLICATION FILED NOV. 21, 1910.
1,294,361.
Patented Feb. 11, 1919.
5 SHEETS—SHEET 1.
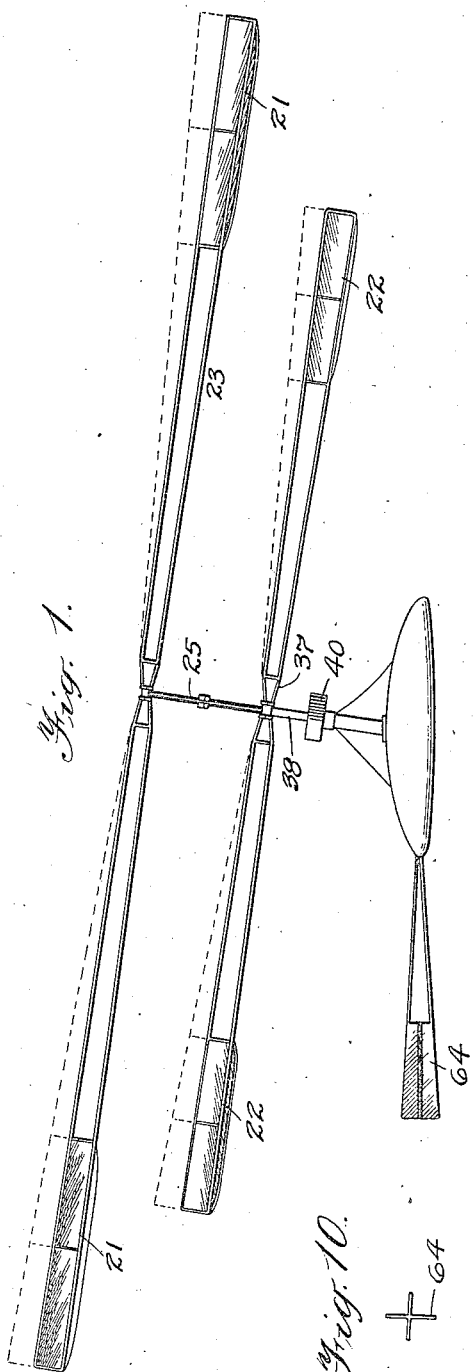
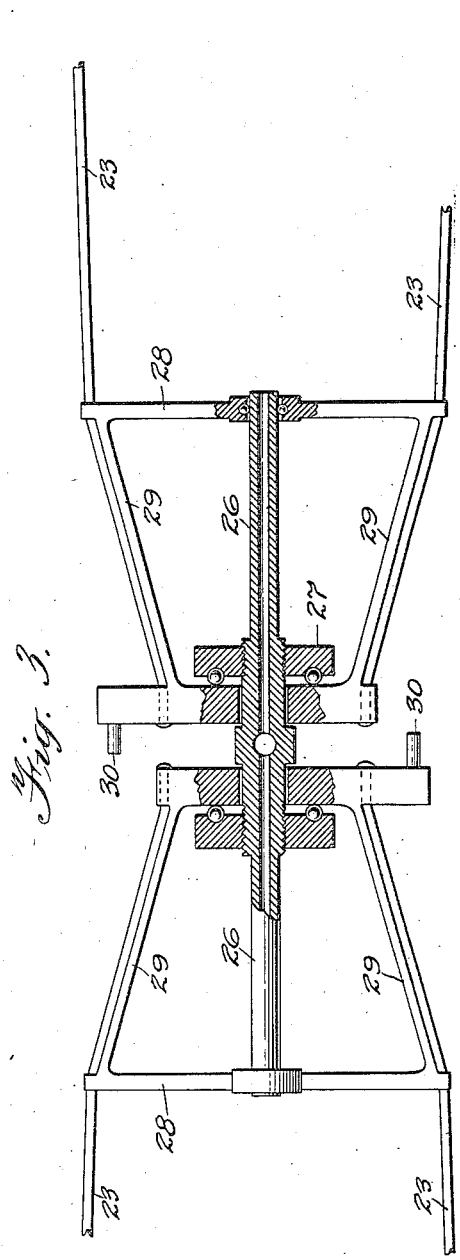
Inventor
Lewis Hallock Nash

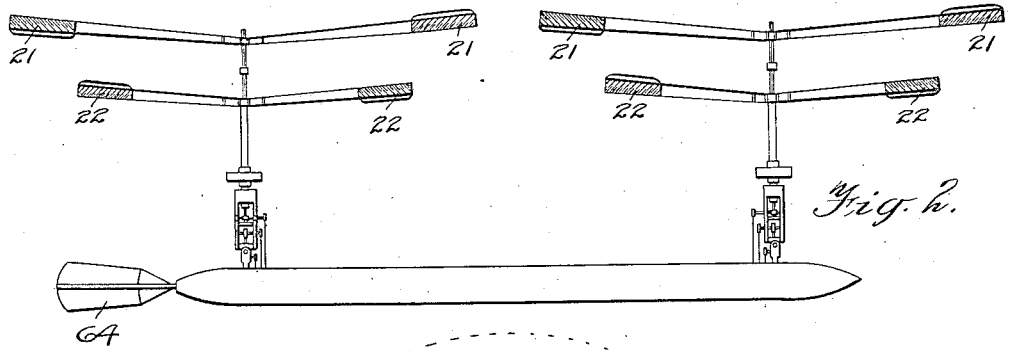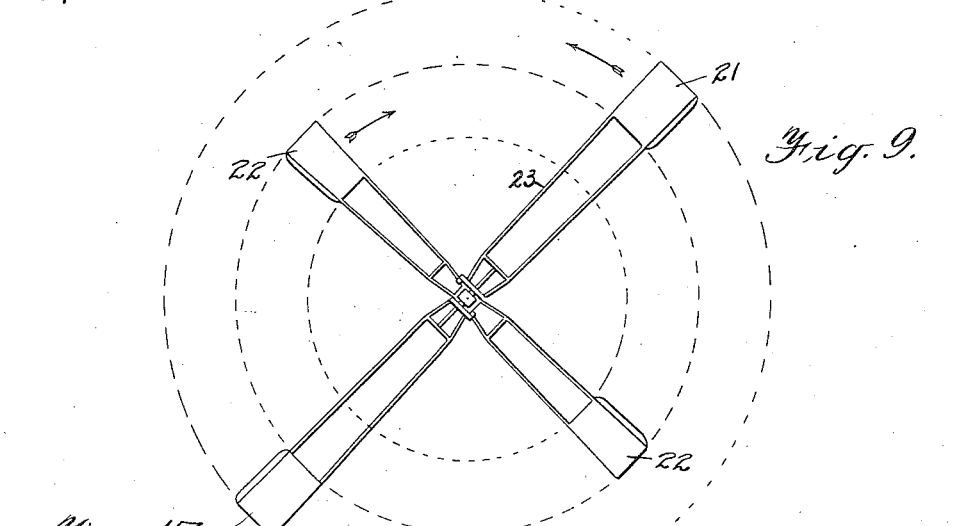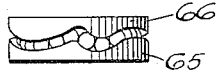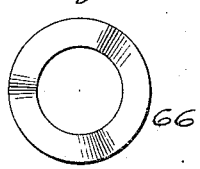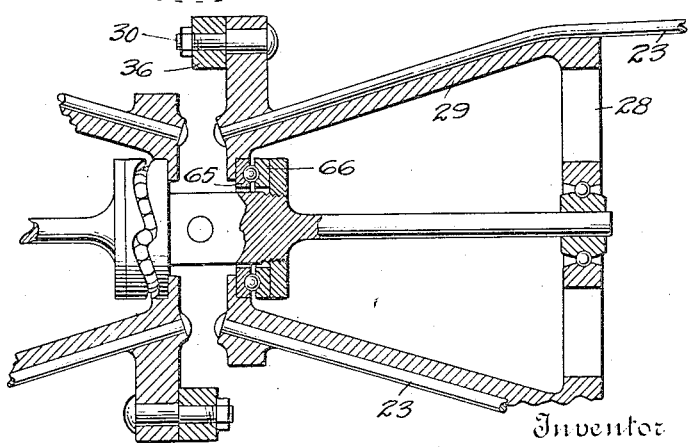

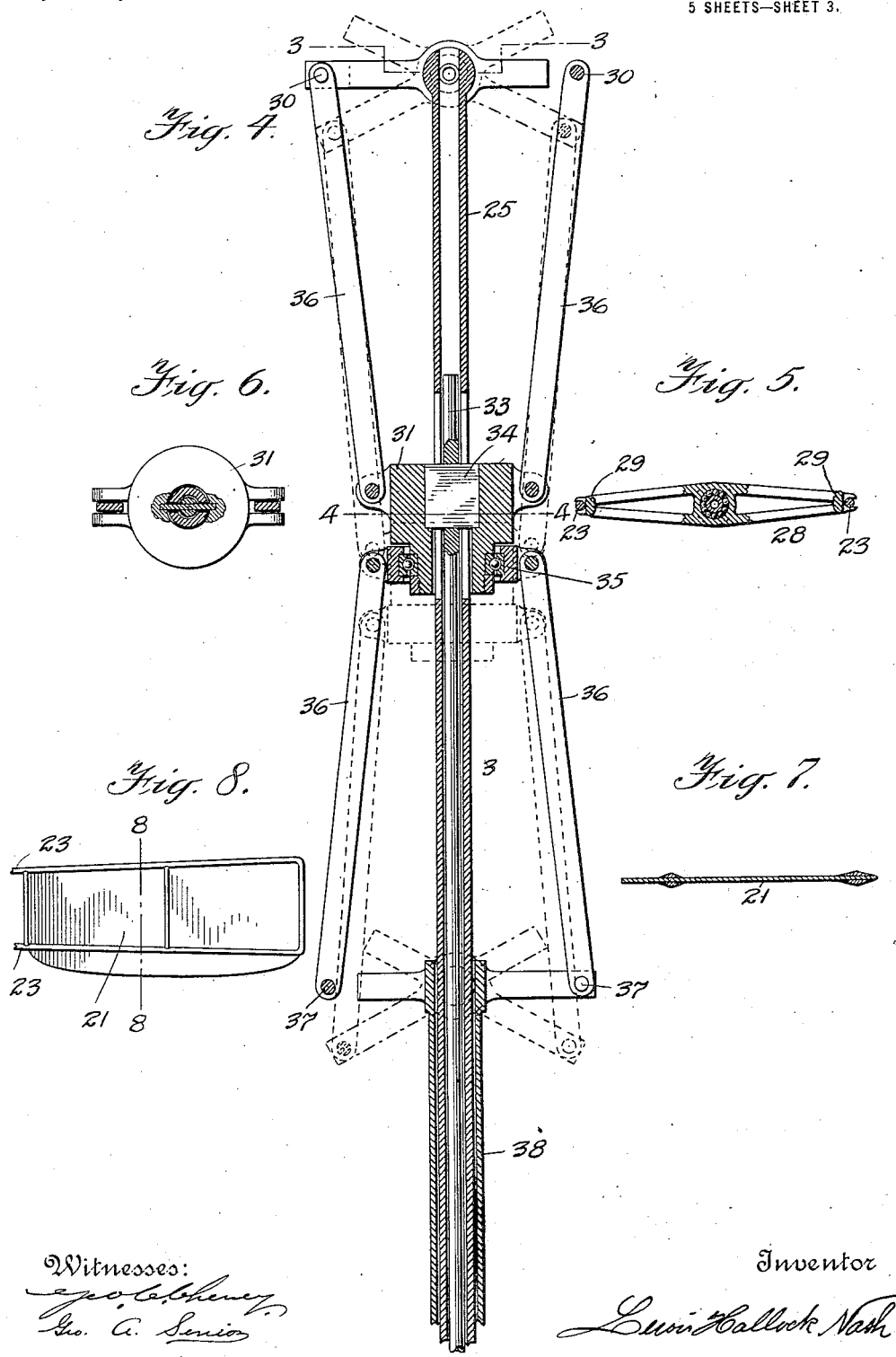

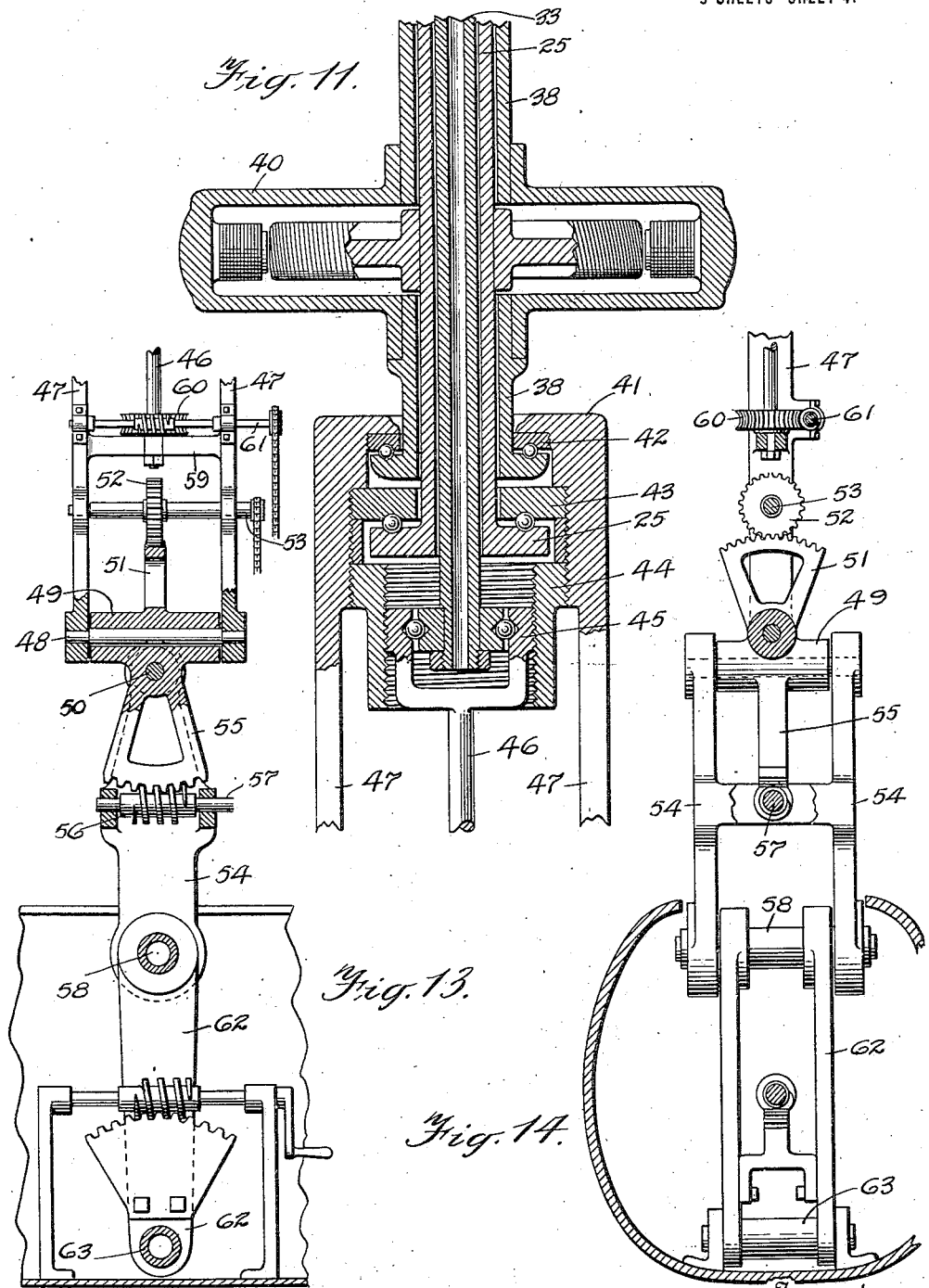

L. H. NASH.
ART OF FLYING AND METHOD OF OPERATING FLYING MACHINES.
APPLICATION FILED NOV. 21, 1910.
1,294,361.
Patented Feb. 11, 1919.
5 SHEETS—SHEET 5.
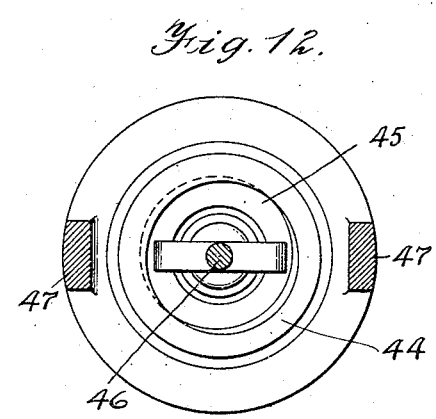
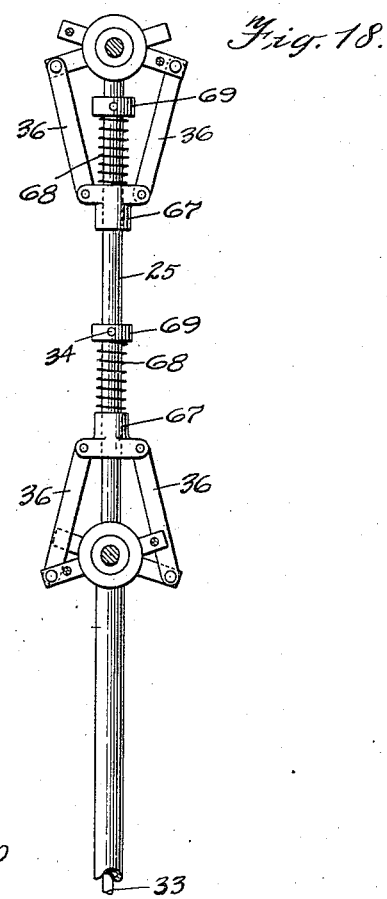
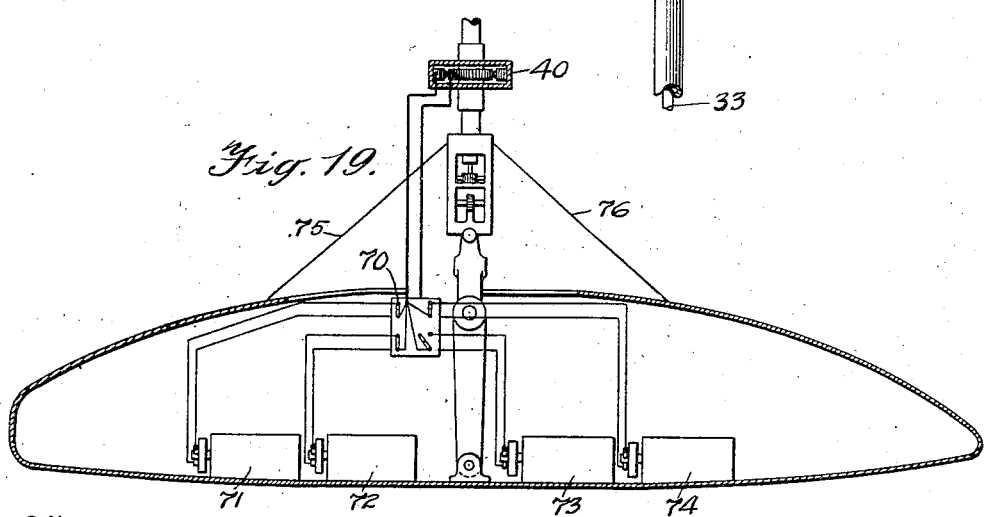
Witnesses:
Inventor
Lewis Hallock Nash

UNITED STATES PATENT OFFICE.

LEWIS HALLOCK NASH, OF SOUTH NORWALK, CONNECTICUT.

ART OF FLYING AND METHOD OF OPERATING FLYING-MACHINES.

1,294,361.   Specification of Letters Patent.   Patented Feb. 11, 1919.

Application filed November 21, 1910. Serial No. 593,456.

*To all whom it may concern:*

Be it known that I, LEWIS HALLOCK NASH, a citizen of the United States, and a resident of South Norwalk, county of Fairfield, State of Connecticut, have invented certain new and useful Improvements in the Art of Flying and Methods of Operating Flying-Machines, of which the following is a specification.

My invention relates to air navigation and consists in certain improvements in the art of flying and method of operating flying machines; and also in certain mechanism by which said methods of operation can be secured.

I do not limit my invention to the exact form of mechanism shown, since many modifications may be made in said mechanism without departing from the spirit and scope of my improvements.

In the claims I will carefully point out the special features of novelty that constitute my invention.

The art of flying consists in securing a buoyant resistance from the air by the use of wings or plane surfaces, which resistance shall equal the weight of the body supported, and in giving said body a motion of translation. The buoyant resistance is due to the velocity imparted to the air by the suspending member, and this resistance is determined by the square of the velocity imparted to the air multiplied by the quantity of air affected. The area of the surface in action does not of necessity determine the quantity of air affected; the important question is, how the surface acts; that is to say, that surface is most effective which will impart a given velocity to the greatest quantity of air.

Since the power required is proportional to the resistance multiplied by the velocity, it follows that the greater the quantity of air that can be affected, the less will be the power required to sustain the body. It is for this reason that a flying machine requires less power to sustain it when in rapid motion, since a greater quantity of air is passed over when the machine is in motion, and the spread of the bearing surface multiplied by the distance traveled in a given time, represents the area of the surface of air affected, and this multiplied by the velocity imparted to the air gives the quantity of air affected.

The size and weight of an aeroplane of fixed surface increases rapidly with enlarged dimensions. One feature of my invention consists in a means for securing a great effect from a small surface acting at high velocity.

I will now describe one form of mechanism by which the above result is effected, which I have called my revolving aeroplane.

Figure 1 shows an external view of an air ship having rotary aeroplanes.

Fig. 2 shows a similar view of an air ship having more than one set of rotary aeroplanes.

Fig. 3 is a detail showing the feathering device of the wings taken on the broken line 3, 3, of Fig. 4.

Fig. 4 shows a longitudinal section of the same.

Fig. 5 is a section of one of the swivels shown in Fig. 3.

Fig. 6 is a section of the swivel 4, 4, of Fig. 4.

Fig. 7 is a section of one of the blades on the line 8, 8, of Fig. 8.

Fig. 8 is a plan of one of the blades.

Fig. 9 is a plan of the revolving aeroplanes.

Fig. 10 is an end view of the steering rudder.

Fig. 11 is a longitudinal section through the shaft motor and thrust bearing.

Fig. 12 is a view looking upward in Fig. 11 showing the thrust bearing.

Fig. 13 is a detail of the adjusting mechanism of the shaft.

Fig. 14 is a view at right angles to Fig. 13.

Fig. 15 is a detail of a modified form of swivel.

Fig. 16 is a plan of a roller bearing with helical bearings.

Fig. 17 is a side view of the same.

Fig. 18 is a longitudinal view of the governor device.

Fig. 19 is a diagrammatic view of the car and power plant.

Referring to the drawings:—

Figs. 7 and 8 show a plane surface, 21, made preferably of metal and of a designated weight. Two of these blades are connected on opposite sides of a revolving shaft (Fig. 9) by tie rods, 23, 23, and these rods are connected to a feathering device, so that the pitch of the blades can be adjusted. The details of this feathering device will be particularly described hereafter. The tie rods, 23, 23, are designed so as to have only enough stiffness to hold the weight of the blades when they are not revolving, and tensile strength of the rods is relied upon to support the structure, which operates as follows:—

Suppose the blades to be revolving at a high velocity with no pitch. They will thus traverse a flat circular plane surface of a diameter equal to the length of the blades and tie rods, and these rapidly moving planes will effect the whole surface described by them in a manner similar to that of a non-revolving plane of equal size.

The flatness of the plane will be maintained by the centrifugal force in the revolving body, and may be as great as the strength of the tie rods will permit.

If, now, an upward pressure be caused to act on said structure, the planes will lift and describe a conical surface, in which position the tension rods will pull at an angle to each other and thus produce a lifting effect on the revolving shaft which will be equal to the tension in the rods multiplied by the sine of the angle of inclination. It will thus be seen that by the use of a simple system of tie rods and blades revolving at high velocity, I am able to produce an aeroplane structure of great stiffness and small weight and great effective surface; and this revolving aeroplane may be made to glide and operate in a similar manner to an aeroplane of fixed structure.

When the motive power of the engine is shut off the device descends through the air and the pressure of the air on the under faces of the blades rotates the aeroplanes and the pitch of the blades is such as to make the aeroplanes rotate at high velocity. As explained hereafter, the pitch of the blades may be controlled by an automatic governor so that sufficient speed of rotation may be maintained to hold the blades out by centrifugal force, thus forming the necessary resistance to the descent of the machine so that the operator may glide in a gradual descent.

If, on the other hand, the blades be given a pitch upward and they are driven by a motor of sufficient power, the aeroplane will lift as well as glide, and the whole quantity of air acted upon will equal the surface described by the diameter of the blades multiplied by the space traveled and multiplied by the velocity imparted by the revolving blades. While I may use a separate motor and propeller to drive my revolving aeroplane in the same manner as a fixed aeroplane is driven, I prefer to cause the revolving aeroplane to act as a propeller.

I prefer to use the aeroplanes in pairs revolving in opposite directions and to drive them by a motor attached to both revolving parts, as will be more fully described. On larger airships I may use a number of revolving aeroplanes, as may be desired. Fig. 2 shows a device having two such revolving aeroplanes, and it will be readily understood that any number can be used if desired. The devices may be propelled in series or in parallel, as desired.

Balance and control.

The revolving aeroplane will exert a pressure on the air, the center of which effort will be above the airship, but not of necessity in the center of the revolving shaft. The position of this center of pressure will change as the air pressures vary. Eddies will bring unequal pressures on different portions of the surface, and velocities of translation will also affect it to some extent.

When the center of gravity of the car is directly below the center of effort of the aeroplane, the device will be stable. If, however, the axis of rotation of the blades be inclined the car will be pulled in the direction of the inclination of the shaft.

By moving the center of gravity of the car in relation to the axis of the shaft, a point may be found wherein the axis of the shaft may be vertical and the center of gravity of the car will be directly under the center of effort, and there will be no tendency of the car to move. This effect is utilized to accomplish two purposes; first, to propel in a given direction, and second, to steer the ship.

In order to propel the device it is only necessary to give the axis of the aeroplane an inclination forward in the direction of the desired motion. The speed of motion will then be determined by the forward component of the line of force of the shaft. The mechanism for controlling the inclination of the shaft will be fully described, but I am now considering the effect of such inclination.

It will thus be seen that the speed of the ship can be controlled by controlling the inclination of the shaft in the forward direction.

Steering.

In order to traverse in a straight line the center of effort must be in the vertical plane through the center of gravity of the car and the center line of rotation must be parallel thereto; that is to say, if the center line of effort pulls sidewise, the car will move toward that side, and the act of steering consists in shifting this line to produce the pull in the desired direction. This is accomplished by shifting the center of gravity of the car with relation to the center line of the shaft. Since the center of effort of the revolving plane is always changing by reason given, the steersman must shift the relation of these elements to meet the required conditions.

It will thus be seen that the balance of the car is perfectly secure, because any result of tipping is instantly manifest in a motion of translation, and the guidance of the helmsman restores equilibrium. The gyroscope effect of the revolving blades also tends to prevent sudden changes. I may also use ordinary forms of air rudders in the usual manner.

I will now describe one form of mechanism adapted to carry into effect my improved method of flying; it being understood that I do not confine my invention to the exact form of structure shown, as many modifications may be made which operate essentially in the same manner.

Feathering device.

Referring to Figs. 3 and 4;—Fig. 3 is a cross-section on the line 3, 3, of Fig. 4. The end of the shaft 25, has formed thereon cross-bars 26, 26, upon which are mounted swivels with frictionless bearings. These swivels have cross-bars 28 connected by thrust bars, 29, to cross-rods on which are mounted ball bearings, 27. The pins, 30, serve to connect rods 36 to the moving mechanism, so as to rotate the swivels. The tie-rods 23, are firmly secured to these swivels at one end and said rods are secured to the blades 21. When subjected to centrifugal force the blades will hang in line with the point of support at the swivels and by rotating the swivels, the blades will take up a corresponding position. The shaft, 25, is hollow and has a rod 33 passing through it, and a key, 34, connects said rod with a block, 31, which slides on the outside of the shaft, 25, so that by moving the rod, 33, up and down the block 31 will have the same motion. The block 31, carries a collar, 35, which is mounted on a ball bearing so as to revolve freely. Lugs are provided on the block, 31, to receive the rods 36 which connect it with the swivel pins 30 of the swivels. The collar, 35, also has tie-rods 36, which connect with swivels of a second aeroplane, 22, which is constructed in the same manner as the one just described, and which is mounted on a hollow shaft, 38, and driven in a similar manner. This shaft, 38, is secured to the frame of an electric motor, 40, while the shaft, 25, is secured to the armature.

The whole mechanism is suspended in a bearing device shown in Figs. 11 and 12.

A ring block, 41, is provided with thrust bearings, 42, 43, which operate with collars on the shafts 25 and 38, and which take the upward lift of the said shafts. A nut, 44, locks the whole in place; the said nut is provided with a screw thread and the outer portion of a roller bearing, 45, fits in said screw thread. The inner portion of said bearing is securely mounted on the rod, 33, so that while the rod, 33, is free to revolve, it will travel up or down as the nut 45 goes up or down. Hence, by turning the nut, 45, up or down, the rod 33 will be moved and impart its motion to the blades 21 and 22, to control their position and pitch. The nut, 45, is operated by a rod, 46, by the steersman. The ring, 41, is mounted on the rods, 47, as will be presently described.

While I have shown an electric motor as the driving force I may use any other form of motor, as a gas engine or a turbine engine, as the other features of my invention may be utilized with any form of motive power.

Power plant.

Many of the principal features of my invention can be utilized with any available source of motive power, as a gas engine or a turbine engine, and I do not confine my invention to any particular form of motive power. But I will now describe one form of power mechanism.

I prefer to place the motor above the car and to mount the armature on the inner shaft, 25, and to mount the ring or field, on the outer shaft, 38. The whole motor is then mounted in bearings already described in Figs. 11 and 12, so that both the armature and the fields may rotate freely. By this means, both parts with their attached revolving planes are free to revolve with little resistance, even when there is no electric current passing through the motor, by presure of air on the planes, as will be more fully described hereafter. The current for driving this motor may be obtained from generator driven by a separate engine carried in the car, or by a battery or any other available source. These latter sources I have called the primary motors, and the ones mounted on the shafts are called the secondary motors. In the operation of the device I may control the amount of current that is given to the secondary motor by regulating its source in the primary motor, and this is the method of operation I prefer to use in connection with revolving aeroplanes controlled by a governor. But since the maintenance of the power plant is a vital feature of a flying machine, I provide means for controlling each part by hand, if an emergency arises. For the same reason, I also provide a number of primary sources of power which may be used separately or jointly, as desired, and in any combination.

One advantage in the method of mounting the motor so that both armature and field ring revolve in opposite directions is that since the relative speed of the parts is nearly double that of either part, the weight of the motor for a given power is reduced in the same proportion. It will be also understood that a multiple cylinder gas engine or a steam turbine, or similar device, may be mounted and operated in the same way.

Controlling mechanism.

In Figs. 13 and 14 I have shown one form of mechanism for controlling the relation of the supporting members to the car. The rods, 47, connect with the same rods shown in Figs. 11 and 12, and these rods are supported on a pin bearing, 48. The pin, 48, supports a universal joint block, 49, which has a bearing, 50, at right angles to the bearing 48. This block 49 is free to turn around the said pin, 48, and it is provided with a gear sector, 51. A pinion, 52, is mounted on a shaft, 53, which is supported in the rods 47. Hence, by turning the shaft 53, the angle of the block with relation to the rods, 47, is controlled. The lower bearing, 50, of the said block supports a link, 54. A worm wheel sector, 55, is attached to said block, 49, and it is operated by a worm, 56, which is mounted in the link, 54, on a shaft 57. Hence, by turning the shaft, 57, the angular relation of the block with regard to the link, 54, is controlled. The links, 54, have a bearing pin, 58, at their lower end, and the car is suspended from said pin 58. The rod, 46, has a bearing on a cross-bar, 59, and is provided with a worm wheel, 60, and operated by a shaft and worm, 61. Hence by turning the shaft 61, the nut 45 of the feathering device will be operated. The shaft 46 is secured to the nut 45 and in the form shown in Fig. 11 is made integral therewith. It will thus be seen, by reference to Figs. 11 and 13, that the nut 45 and the wheel 60 will move together. The wheel 60 is made to rotate with the shaft 46 by any suitable means, such as a sliding key connection. These three shafts, 53, 57 and 61, are connected by suitable flexible driving mechanism with the pilot house of the airship, and by the manipulation of these shafts the feathering of the blades can be controlled by shaft 61; the forward pitch of the aeroplanes can be controlled by the shaft 57; and the sidewise inclination of the axis of the aeroplane with regard to the airship can be controlled by shaft 53 for the purpose hereinbefore pointed out.

It is very important in an airship that there should be some means of controlling its balance in spite of any effort of tipping or plunging, for if a car and its propelling mechanism all tip together the pulling effort might cause disaster. The lines of effort should therefore be controlled by some member that will retain its position in regard to the vertical line. A weight suspended from a support will give a vertical line. I use the weight of the car to fix a vertical member. The link, 54, is supported at its upper end in the bearing 50, while the car is supported from the lower end of the link on the pin 58. It therefore follows that this link must always stand vertical or inclined to just enough angle to give a forward motion to the car. Any tendency of the aeroplane to tip further will result in increased speed until a point of stability is reached where the speed of the car just balances the pull of the propeller. Since the weight of the car is supported on the pin, 58, the movement of the car in pitching will not be communicated to the links, 54. These links will therefore stand in a vertical position under the supporting pin, 50.

The advantage of this construction is that the forward inclination of the axis is controlled by its angular relation to the links, 54, and since the links 54 do not change, the forward angle will also remain fixed and the danger of the car diving will be avoided; that is to say, when the forward angle is once fixed, the pull forward will continue uniform and the change of level of the car will not effect this angle; therefore, the impelling force will be constant. Since the area of the surface of the car is very small compared with the area of the surfaces of buoyancy, the position of the car will have little effect in sustaining its weight. Nevertheless, for the comfort of the passengers it is important to keep the car in a level position, and for the sake of reducing air resistance to motion it is necessary that the car should travel in the axial line of the car.

I may use any desired way to balance the car by shifting weights, or otherwise, but I prefer to accomplish this result by shifting the point of support of the car forward or backward until the desired level is reached. One way of accomplishing this is shown in Figs. 13 and 14, wherein a link, 62, is attached to the car by a pin 63, and the upper end of the said link is secured to the pin 58. By moving the link, 62, forward or backward, the point of support of the car, 58, will be carried forward or backward with relation to the center of gravity of the car.

When the desired balance of the car is once secured, the position of the car can be maintained by a vertical rudder, 64, in the usual manner.

Rising or falling of the car.

When the car is in full flight, the power required will depend on whether the car is ascending or descending or running on a level course. Increasing the pitch of the blades will require the engine to increase its power to the amount required to lift the car at the speed determined. If, on the other hand, the angle of the blades is decreased, the power required will be lessened. When the pitch is at a level, the only power required will be that necessary to overcome the resistance of revolution of the aeroplane. If the angle of pitch be still further changed, so as to dip downward, the air pressures will rotate the aeroplane when it descends.

It will thus be seen that when the car has reached a high altitude it may be caused to glide over a long distance with little or no power, and even if the motive power were out of order, the car could be brought to a landing place, and it also follows that the power originally expended in lifting the car may thus be utilized in impelling it in the same manner as an ordinary aeroplane upon the downward motion.

It will be understood that there are many ways of controlling the various features of operation hereinbefore described, and that the pilot may regulate them by hand in any order that may be desired but it is desirable that there should be some automatic means for controlling the speed of rotation of the aeroplanes, in order that they will never stop revolving when the ship is once in flight, however the available power may vary. Since we have seen that the pitch of the blades may be utilized to control the amount of power expended, I may make use of this feature to control the speed of rotation of each aeroplane by use of a suitable speed governor; that is to say, by varying the angle of pitch the resistance to rotation will be varied to maintain a constant speed of rotation.

While I may use any form of speed governor, I may utilize the centrifugal force of the revolving blades for this purpose. I do not, however, confine my invention to any particular form of governing device.

Among the advantages of the method of control above described, may be mentioned that the tension members in the aeroplane are insured against undue strain because as soon as the strain reaches a given amount, it automatically acts to prevent further increase of rotation, and thus prevents the parts from breaking.

Another feature is that the desired speed of rotation is maintained, even if the power is stopped and that the machine will remain in flight whether the power expended is large or small. The operator may therefore give his attention to other matters.

I will now describe one form of mechanism by which this result may be secured.

Referring to Fig. 15, which shows a swivel of the form previously described and mounted on the shaft as before described.

Figs. 16 and 17, show details of the thrust bearing. The ball races are in the form of a threaded screw having three threads or helical surfaces. It will be seen that if the two bearing rings, 65 and 66, be subjected to end pressure, the balls will tend to roll down the inclined surface and thus cause the said parts to rotate with respect to each other. When these parts are placed in the swivels, as shown in Figs. 15 and 18, and the swivels are subjected to centrifugal force, the said swivels will be rotated by an amount of torque proportional to the pitch of the surfaces. The swivels are connected to a sliding collar, 67, by the links, 36; a spring, 68, is supported by a collar, 69, and said spring tends to incline the blades downward. This tendency of the springs is resisted by the centrifugal force of the blades. When the centrifugal force is great enough to overcome the resistance of the springs, the blades will revolve so as to pitch upward. As before described, the increasing of the pitch also increases the resistance to rotation of the aeroplane and prevents further increase of speed of the revolving blades. The collar, 69, may be secured by a key, 34, to the sliding shaft, shown in Figs. 4 and 11, so that the tension of the spring and speed of the aeroplane can be controlled by the operator.

Each of the aeroplanes may be provided with the same form of device and it therefore results that the two revolving aeroplanes will each travel at a given speed, and will exactly balance each other.

I provide the car with a rudder having blades like the feathers of an arrow and mount it in a bearing so that it may be moved up or down or sidewise by the steersman. When the car is in rapid motion, this rudder may be placed axially and the car will then travel through the air like an arrow. In this condition, the level of the car will indicate whether it is rising or falling and a suitable indicator will show this to the pilot instantly. He will then be able to raise or lower his car at will by controlling the power, and the pitch of the blades as already set forth. The rudder may also be used to guide the car in the usual manner.

In Fig. 19 I have shown a diagrammatic view of a power plant and it will be understood that the motors and generators are to be understood as diagrammatic. The motors for a flying machine will be designed in detail and will form the subject matter of other applications for patents, the exact details of which are not the subject of my present invention.

In Fig. 19 the secondary motor, 40, is electrically connected to a switchboard, 70. I have shown four primary motors, 71, 72, 73, and 74, preferably high speed turbo-generators, each having leads connecting with the said switchboard, so that any one or all of them may be used to drive the secondary motor. An equivalent form of power plant would be to use a steam turbine at 40 and steam generators in place 71, 72, 73 and 74.

In Fig. 19 I have shown two guy lines, 75 and 76, which are intended to be used to hold the shaft when the motor is not in use, and may also be used for assisting in maintaining its level. These guy lines may be fastened to the car in any convenient manner.

Having thus described a device embodying my invention, I now set forth those features of improvement that I claim as my invention.

1. In a flying machine, the combination with revolving supporting planes and a body suspended therefrom, of means for inclining the axis of the planes in the direction of flight to control the speed of the machine, and independently controlled means for inclining said axis transversely of the direction of flight to guide the machine.

2. In a flying machine, the combination with a body, of a supporting mechanism including rapidly revolving planes arranged vertically above the body, and speed controlled means for directly and automatically increasing the pitch of the planes in correspondence with increase in the speed of rotation and decreasing the pitch of the planes in correspondence with decrease in the speed of rotation.

3. A supporting mechanism for a flying machine, which includes rapidly revolving planes vertically above the suspended body and speed controlled means for automatically changing the pitch of the planes directly by and in accordance with the speed of rotation whereby the pitch will be reversed at a predetermined speed.

4. In a flying machine, the combination with a body, of a supporting mechanism including rapidly revolving planes arranged vertically above the body and so constructed that the pitch thereof will not be affected by change in the longitudinal relation thereof to the axis of rotation, and means for automatically causing a change in the pitch of the planes in correspondence with variation in the speed of rotation, said pitch being reversed when the speed falls to a predetermined minimum.

5. In a flying machine, the combination with revolving planes above the body of said machine for supporting the same, a motor for revolving said planes, and means for automatically so varying the pitch of said planes independently of their longitudinal position with reference to the axis of rotation as to maintain a substantially uniform speed of rotation.

6. In a flying machine, the combination with revolving planes above the body of said machine for supporting the same, a motor for revolving said planes, and means for automatically so varying the pitch of said planes independently of their longitudinal position with reference to the axis of rotation as to maintain the speed of rotation of said planes.

7. In a flying machine, the combination with revolving planes above the body of said machine for supporting the same, and means for turning each plane on a fixed axis and automatically so varying the pitch of said planes when descending by gravity without power, as to maintain a substantially uniform speed of rotation due to the pressure of air against the under surface of the planes.

8. In a flying machine, the combination with a drive shaft of a plane adapted to be rotated thereby, a swivel connected to said shaft to rotate therewith, tension members connecting separated points of said swivel with separated points of said plane, and means for turning said swivel to vary the pitch of said plane.

9. In a flying machine, the combination with a drive shaft of a plane adapted to be rotated thereby, a swivel carried by said drive shaft, tension members connecting said plane with said swivel, and means controlled by the speed of the drive shaft for turning said swivel so as to vary the pitch of said plane.

10. A supporting mechanism for a flying machine which consists in weighted planes revolving at high velocity, tie-rods securing said planes to swivels mounted on a central support, and means for turning said swivels, to vary the pitch of said blades.

11. Supporting mechanism for a flying machine which consists in two systems of rotating blades arranged vertically over each other and rotating in opposite directions, and automatically acting means for simultaneously increasing the pitch of said blades as the speed increases and decreasing the pitch as the speed decreases without altering the longitudinal position of the blades on the axis.

12. Supporting mechanism for a flying machine which consists in two systems of rotating blades arranged vertically over each other and rotating in opposite directions, and means for simultaneously and automatically increasing and decreasing the pitch of said blades in accordance with the increase or decrease speed without altering the longitudinal position of the blades on the axis.

13. In a flying machine, the combination with a drive shaft, of a plane adapted to be rotated by the shaft, speed controlled means for directly and automatically varying the pitch of the plane in accordance with the speed, and auxiliary means under the control of the operator for varying the pitch of the plane.

14. In a flying machine, the combination with revolving planes above the body of said machine for supporting the same, of means for controlling the pitch of said planes by the centrifugal force of said planes independently of their position longitudinally of the axis of rotation.

15. In a flying machine, the combination with revolving planes above the body of said machine for supporting the same, of means operated by the centrifugal force of said planes for increasing the pitch as the speed increases independently of their position longitudinally of the axis of rotation.

16. In a flying machine, the combination with revolving planes above the body of said machine for supporting the same, and means independent of the angular relation of said planes for so regulating the pitch of said planes as to increase the pitch in correspondence with the increase in power applied by the motor.

17. A supporting mechanism for a flying machine which includes two rapidly revolving propellers turning in opposite directions above the suspended body, and means directly controlled by the speed of rotation alone for automatically reversing the pitch of the planes of each propeller.

18. A supporting mechanism for a flying machine which includes two rapidly revolving propellers revolving in opposite directions vertically above the suspended body, and separate means for each propeller directly controlled by the speed of its own propeller for causing an increase in the pitch of the planes of the propeller in correspondence with an increase in the speed of rotation and a decrease in the pitch of the planes in correspondence with a decrease in the speed of rotation.

19. In a flying machine, the combination of a car or body, propellers, a motor, and means for automatically balancing the power of the motor by altering the pitch of the blades of the propellers, independently of their position longitudinally of the shaft, for the purpose described.

20. In a flying machine, the combination of a car or body, two propellers arranged vertically above the body and adapted to revolve in opposite directions, a motor, and means for maintaining a constant speed of rotation of the propellers including devices for automatically varying the pitch of the propeller blades independently of their position longitudinally of the shaft in accordance with variation in the speed of the motor.

In testimony whereof I have hereunto signed my name in the presence of two subscribing witnesses, this 17th day of November, A. D. 1910.

LEWIS HALLOCK NASH.

Witnesses:
 JOSEPH R. GARLAND,
 MARION H. NASH.